US007811615B2

(12) United States Patent
Fein et al.

(10) Patent No.: US 7,811,615 B2
(45) Date of Patent: Oct. 12, 2010

(54) CORRUGATED KNIFE FIXTURE WITH VARIABLE PITCH AND AMPLITUDE

(75) Inventors: Michael O. Fein, Eagle, ID (US); Allen J. Neel, Nampa, ID (US)

(73) Assignee: J. R. Simplot Company, Boise, ID (US)

( * ) Notice: Subject to any disclaimer, the term of this patent is extended or adjusted under 35 U.S.C. 154(b) by 1113 days.

(21) Appl. No.: 11/386,186

(22) Filed: Mar. 21, 2006

(65) Prior Publication Data

US 2006/0169121 A1 Aug. 3, 2006

Related U.S. Application Data

(62) Division of application No. 10/457,953, filed on Jun. 9, 2003, now Pat. No. 7,117,778.

(60) Provisional application No. 60/389,761, filed on Jun. 17, 2002.

(51) Int. Cl.
*A23L 1/212* (2006.01)
*A23L 1/216* (2006.01)
*A23P 1/00* (2006.01)

(52) U.S. Cl. ....................... 426/144; 426/518; 426/512; 426/438; 83/857

(58) Field of Classification Search .................. D1/125, D1/128, 129, 130, 199; D7/673, 381, 693, D7/678, 677
See application file for complete search history.

(56) References Cited

U.S. PATENT DOCUMENTS 965,384 A 7/1910 Gebauer
1,361,776 A 12/1920 Rosenfeld
1,445,555 A 2/1923 Ridpath
1,477,106 A 12/1923 Caldwell
2,464,898 A * 3/1949 Socier ........................ 146/170
3,109,468 A 11/1963 Lamb et al.
3,116,772 A 1/1964 Lamb et al.
3,208,625 A 9/1965 Trabacchi
3,391,005 A * 7/1968 Babigan ..................... 426/438
4,082,024 A 4/1978 Hodges et al.
4,135,002 A 1/1979 Hodges et al.
4,175,690 A 11/1979 Bova et al.
4,198,437 A * 4/1980 Citti et al. ................... 426/104
4,219,575 A 8/1980 Saunders et al.
4,256,777 A * 3/1981 Weaver ....................... 426/637
4,372,184 A 2/1983 Fisher et al.
4,423,652 A 1/1984 Winslow (Continued)

OTHER PUBLICATIONS

The American Heritage Dictionary 1976 p. 1430.*

(Continued)

*Primary Examiner*—Jennifer C McNeil
*Assistant Examiner*—Felicia C King
(74) *Attorney, Agent, or Firm*—Kelly Lowry & Kelley, LLP; Stuart O. Lowry

(57) ABSTRACT

A cut vegetable product such as a wedge-cut potato includes a pair of cut surfaces oriented generally at an acute angle, and each extending and diverging from a common tip toward a heel. Each of the cut surfaces defines a generally wave-shaped configuration with a wave pitch and a wave amplitude. At least one and preferably both of the wave pitch and wave amplitude increases progressively from the common tip toward the heel.

9 Claims, 2 Drawing Sheets

U.S. PATENT DOCUMENTS

| | | | | |
|---|---|---|---|---|
| 4,911,045 | A | 3/1990 | Mendenhall | |
| H001591 | H * | 9/1996 | Fulcher | 426/601 |
| D380,885 | S * | 7/1997 | Goll | D1/125 |
| 2003/0118698 | A1 * | 6/2003 | Lindsey | 426/102 |

OTHER PUBLICATIONS

Ruby Lane Vintage Cookie Cutter http://www.rubylane.com/shops/tapestrycollectibles/item/K27.*

"DK Foods" 1997-2002 www.dkfoods.co.kr/eng/product/product-potato.htm, pp. 1-3.*

"Czech Tree" Ebay Category Vintage 1970's http://cgi.ebay.com/Vtg-Lot-Tin-Cookie-Cutter-Gingerbread-Girl-Czech-Tree_W0QQitemZ300388781366QQcmdZViewItemQQptZLH_DefaultDomain_0?hash=item45f0910d36.*

Czechoslovakia, Wikipedia, http://en.wikipedia.org/wiki p. 1.*

* cited by examiner

CORRUGATED KNIFE FIXTURE WITH VARIABLE PITCH AND AMPLITUDE

This application is a division of U.S. Ser. No. 10/457,953, filed Jun. 9, 2003 now U.S. Pat. No. 7,117,778.

This application claims the benefit of U.S. Provisional Application No. 60/389,761, filed Jun. 17, 2002.

BACKGROUND OF THE INVENTION

This invention relates generally to a knife fixture of the type having at least one knife blade with a corrugated or wavy cutting edge for use in cutting a vegetable product particularly such as a potato to form a correspondingly shaped corrugated or wavy cut surface. More particularly, this invention relates to a corrugated style knife fixture for cutting wedge-shaped potato pieces or the like, wherein the corrugated cut surface contributes to improved product characteristics such as reduced fragility and breakage during subsequent processing, and improved crispness and/or batter pick-up for enhanced consumer acceptance.

Production cutting systems and related knife fixtures are generally well known in the art for cutting vegetable products such as potatoes into smaller pieces of selected size and shape, preparatory to further production processing such as blanching and parfrying. In this regard, a variety of different knife fixtures are known and commonly used to cut whole potatoes, in a peeled or unpeeled state, into a variety of different specific shapes such as elongated French fry strips having a straight-cut or crinkle-cut configuration, cross-cut slices, wedge-shaped pieces and the like. The cut potato pieces are commonly processed by preliminary blanching in hot water or steam, followed by one or more parfrying steps in hot oil prior to final freezing and packaging. In one common production process, the cut potato pieces are also coated with a batter containing selected flavoring and other ingredients, typically prior to parfrying, wherein the batter contributes desirable taste and texture characteristics to the potato pieces when finish prepared, for example, by finish frying or oven heating.

In one typical production configuration, the knife fixture comprises a so-called water knife fixture having one or more knife elements or blades mounted along the length of an elongated tubular conduit. A pumping device is provided to entrain the vegetable product such as a potato within a propelling water flume for cutting engagement with the knife blades. The vegetable product is pumped one at a time in relatively rapid single file succession into and through the conduit with a velocity and kinetic energy sufficient to carry the vegetable product through the knife fixture which severs the product into a plurality of smaller elongated strips at a relatively high production rate. The particular size and shape of the cut product strips is dictated by the geometry of the knife blades, and these cut strips are carried further by the flow stream through a discharge conduit which guides the strips to subsequent processing equipment for size grading, cooking, freezing, packaging, and the like. Examples of such hydraulic cutting systems and related water knife constructions are found in U.S. Pat. Nos. 3,109,468; 3,116,772; 3,208,625; 4,082,024; 4,135,002; 4,372,184; and 4,423,652.

Cut potato pieces having a corrugated or wave-shaped configuration have enjoyed a high measure of consumer approval. In this regard, potato pieces having a corrugated or crinkle-cut shape are characterized by cut surfaces of larger overall surface area having an increased number of relatively thin edges, in comparison with traditional straight-cut potato pieces. As a result, such corrugated cut potato shapes normally exhibit a comparatively enhanced crispy texture when subjected to subsequent parfrying and/or finish frying in hot oil. In addition, when subjected to a batter coating process, such corrugated cut potato pieces also tend to pick up and retain a comparatively greater quantity of the batter, in comparison with straight-cut potato pieces, to result in a relatively enhanced flavor and texture attributable to the batter.

Wedge-shaped potato pieces, herein referred to a potato wedges, have become a popular specialty item served at many restaurant facilities as an alternative to traditional straight-cut or crinkle-cut French fry strips. Such products are cut from whole potatoes into elongated wedge-shaped pieces each having a pair of cut surfaces which angularly intersect at a narrow cut tip located generally at a longitudinal centerline of the potato, and which diverge radially outwardly at an acute angle to an enlarged heel corresponding with the external surface of the potato which may remain unpeeled. Attempts to provide an improved potato wedge product wherein the cut surfaces have a corrugated or wave-shaped configuration, however, have met with limited success. In particular, in a traditional corrugated profile, the wave-shaped cut surfaces are sufficiently reduced in thickness in localized regions at the narrow cut tip to form an undesirably thin and fragile structure which tends to break in the course of subsequent processing and handling steps. The presence of any significant proportion of broken potato pieces provides a substantial negative impact upon product appearance and perceived product quality.

The present invention provides an improved knife fixture particularly for use in cutting vegetable products such as potatoes into wedge-shaped pieces, and the resultant cut potato wedges, having corrugated cut surfaces of a modified geometry for substantially minimizing and eliminating undesirable product breakage in the course of production and handling.

SUMMARY OF THE INVENTION

In accordance with the invention, a corrugated knife fixture is provided for cutting vegetable products or the like, particularly such as potatoes, into elongated wedge-shaped pieces having corrugated or wave-shaped cut surfaces of a variable pitch and variable amplitude geometry resistant to product breakage during normal production processing and handling. The invention further comprises the elongated product wedges cut by the corrugated knife fixture.

The knife fixture includes one or more knife blades each having a cutting edge with a variable pitch and variable amplitude geometry. In one preferred form, the knife fixture is mounted in-line along the length of a tubular conduit through which the product such as whole potatoes are propelled in single file by a water flume. The knife blade or blades are arranged for cutting each potato into a plurality of elongated wedge-shaped potato pieces each defined by a pair of wave-shaped cut surfaces which angularly intersect at a narrow cut tip located generally at a longitudinal centerline of the potato, and which diverge radially outwardly at an acute angle to an enlarged heel corresponding with the external surface of the potato which may remain unpeeled. The knife blade or blades define the variable pitch and variable amplitude cutting edges wherein the pitch and amplitude progressively increases from the cut tip of the wedge toward the heel or external surface thereof. In a preferred configuration, these cutting edges define a short straight-cut segment adjacent the narrow cut tip, wherein this straight-cut segment merges with the variable pitch and amplitude wave configuration.

The resultant corrugated or wave-shaped cut surfaces imparted to each potato wedge beneficially contribute to enhanced product characteristics particularly in the finish prepared state. More specifically, the wave-shaped cut surfaces provide an increased overall cut surface area with numerous turns and relatively narrow corners and edges for enhanced crispness in response to parfrying or frying, and for enhanced batter pick-up for improved flavor and texture. These benefits are provided without undesirable thinning of the narrow cut tip of each potato wedge, whereby product breakage during production processing is reduced and substantially eliminated.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
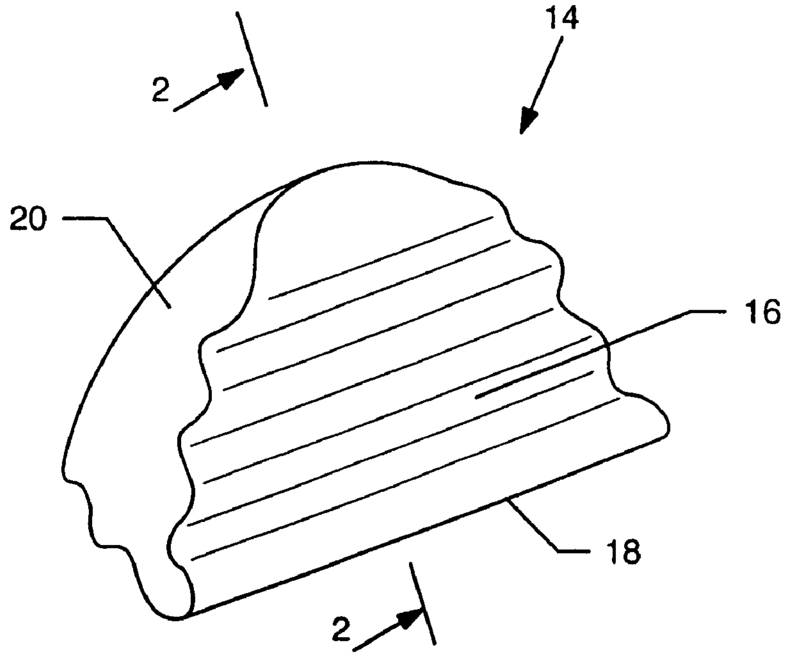
FIG. 1 is a perspective view showing a potato wedge cut with a corrugated knife fixture in accordance with the present invention.
Figure 2:
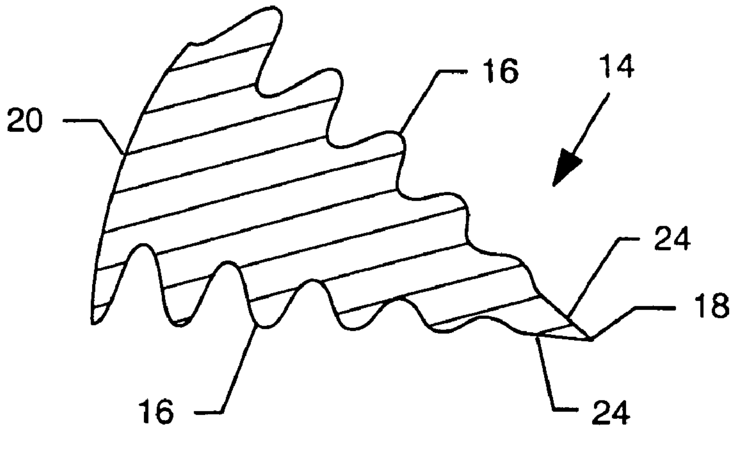
FIG. 2 is a sectional view taken generally on the line 2-2 of FIG. 1.
Figure 3:
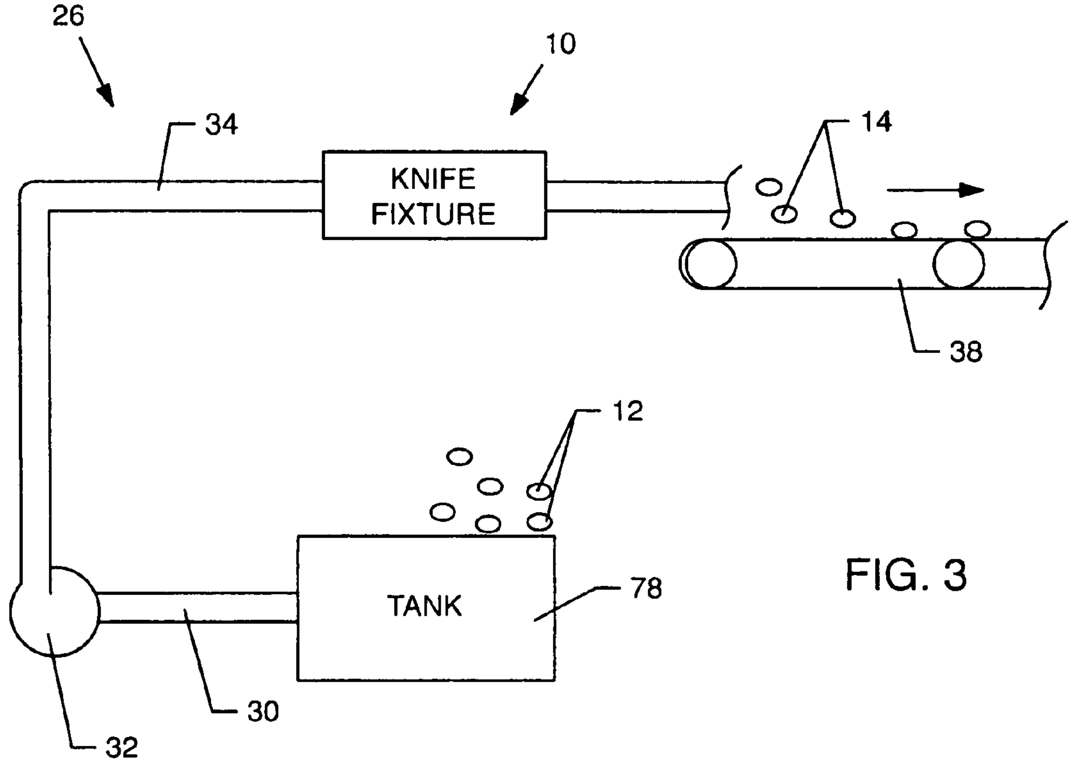
FIG. 3 is a schematic diagram depicting an hydraulic cutting system incorporating a corrugated knife fixture constructed in accordance with the invention.
Figure 4:
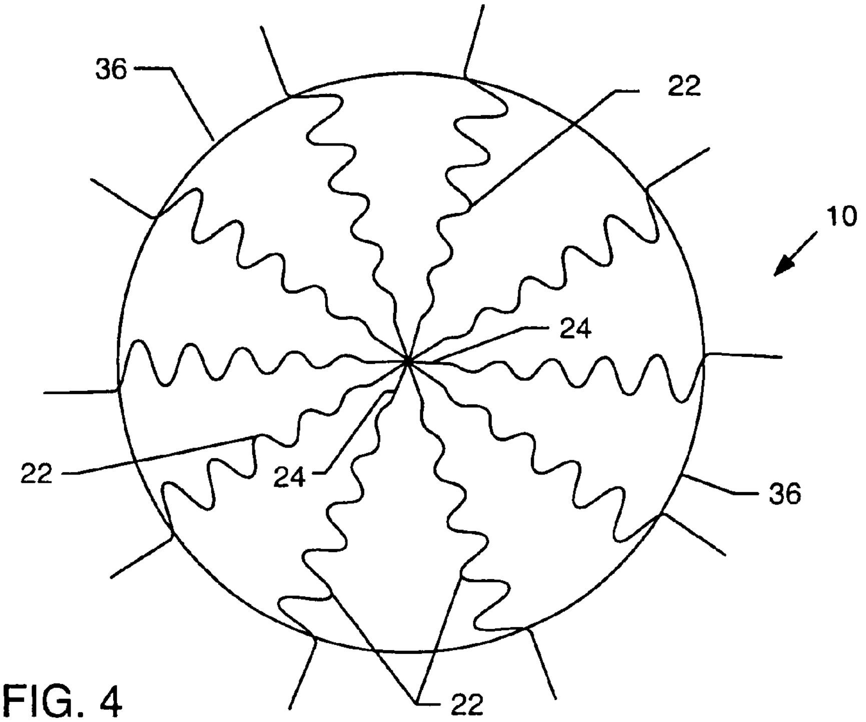
FIG. 4 is an enlarged and somewhat schematic sectional view taken generally on the line 4-4 of FIG. 3, and showing a plurality of knife blades forming the knife fixture.

As shown in the exemplary drawings, a corrugated knife fixture referred to generally in FIGS. 3 and 4 by the reference numeral 10 is provided for cutting vegetable products particularly such as whole potatoes 12 (FIG. 3) into elongated pieces such as wedge-shaped potato pieces 14 as viewed in FIGS. 1 and 2. In accordance with the invention, the potato pieces 14 include cut surfaces 16 having a corrugated or wave-shaped configuration defined by a variable pitch and/or a variable amplitude which increases from a narrow cut tip 18 toward an enlarged heel 20 corresponding with an external surface of the potato.

FIGS. 1 and 2 illustrate a wedge-shaped potato piece 14, or so-called potato wedge, cut by the knife fixture 10 from a whole potato 12. As shown, the potato wedge 14 is defined by the angularly oriented cut surfaces 16 which intersect generally at the narrow cut tip 18 corresponding substantially with a longitudinal centerline of the whole potato. These cut surfaces 16 diverge radially outwardly from the tip 18 at an acute angle having a magnitude related to the number of potato wedges 14 cut from a single whole potato 12. In the exemplary knife fixture 10 as viewed in FIG. 4, the knife fixture is designed to cut each whole potato 12 into a total of ten substantially equal-sized potato wedges 14, whereby the cut surfaces 16 of each potato wedge diverge from the tip 18 at an acute angle of about 36°. These cut surfaces 16 terminate at the enlarged heel 20 of the wedge 14, wherein the heel 20 is defined by the natural external potato shape which may remain unpeeled.

In accordance with the invention, each wave-shaped cut surface 16 is defined by the variable pitch and/or variable amplitude geometry imparted thereto by the knife fixture 10. More particularly, the knife fixture 10 comprises one or more knife blades 22 (FIG. 4) defining a plurality of cutting edges each having a wave configuration such as a sinusoidal shape. This wave configuration is variable in terms of pitch and/or amplitude, and preferably both, to progressively increase from a relatively small pitch and amplitude adjacent the narrow cut tip 18 toward the larger heel 20 of each potato wedge 14. Moreover, in a most preferred form, each cutting edge further defines a relatively short straight-cut segment 24 immediately adjacent the cut tip 18 of each potato wedge 14.

With this geometry, the diverging cut surfaces 16 of each potato wedge 14 directly reflect the shape of the knife fixture cutting edges, to provide minimal wave trough depth (amplitude) and a relatively short wave length (pitch) in the region of the narrow cut tip 18. This trough depth (amplitude) and wave length (pitch) increases progressively from the tip 18 to the heel 20. The resultant cut potato wedge 14 has a unique and distinctive geometric shape and appearance, wherein the narrow cut tip 18 has a wavy configuration which is sufficiently thin to provide a desirable crisp texture in response to subsequent parfrying or frying. However, this narrow cut tip 18 also exhibits sufficient thickness to avoid creation of a fragile edge which would otherwise be susceptible to undesirable breakage during subsequent processing and handling. Instead, the cut tip 18 is characterized by sufficient thickness to substantially prevent such undesirable product breakage.

In addition, the corrugated cut surfaces 16 have a substantial trough depth (amplitude) and a substantial trough length (pitch) in the region spaced away from the narrow cut tip 18, to define a large cut surface area characterized by substantial crispness in response to parfrying or frying, and substantial batter pick-up and retention when subjected to a batter coating step.

FIG. 3 illustrates an exemplary hydraulic cutting system 26 employing the knife fixture 10 to cut whole potatoes 12 into a plurality of potato wedges 14. As shown, vegetable products such as whole potatoes 12 are delivered to a reservoir or tank 28 where they are subjected to a fluid pressure on the order of about 15-20 psi and suitably maintained in fluid suspension for facilitated intake flow through an inlet conduit 30 to a pump 32. The pump 32 propels the potatoes 12 in single file relation within a propelling water flow stream or flume through an elongated tubular delivery conduit 34 into cutting engagement with the knife fixture 10. In a typical cutting system, the potatoes are propelled through the delivery conduit 34 at a relatively rapid speed of about 40-60 feet per second. The delivery conduit 34 may incorporate a centering alignment fixture (not shown) for substantially centering each propelled potato on a longitudinal centerline of a flow passage through the knife fixture 10, in a manner know to persons skilled in the art.

The water knife fixture 10 comprises the plurality of knife elements or blades 22 arranged to extend across the fixture flow passage in a grid pattern selected to cut each whole potato 12 into the plurality of elongated wedges 14. FIG. 4 illustrates one arrangement for the knife blades 22 wherein a plurality of ten radially extending blades are linked to a common center and extend radially outwardly therefrom with outer ends supported within a fixture housing 36. Alternately, persons skilled in the art will recognize and appreciate that the blades 22 may be constructed in the form of a plurality of diametrically extending units spanning the fixture flow passage and supported by the fixture housing 36 is closely spaced axial succession. In either configuration, the sets of blades 22 subdivide each potato 12 into the multiple wedges 14 as the potato is propelled through the knife fixture 10 by the water flume. At a downstream side of the knife fixture 10, the cut potato wedges 14 are typically delivered to a conveyor 38 or the like for appropriate transport to a subsequent production process station (not shown).

A variety of modifications and improvements in and to the hydraulic cutting system of the present invention will be apparent to those persons skilled in the art. For example, while the invention is shown and described with respect to an hydraulic cutting system, it will be recognized and appreciated that the variable pitch and variable amplitude concept may be employed with other types of cutting systems for cutting vegetable products such as potatoes. Accordingly, no limitation on the invention is intended by way of the foregoing description and accompanying drawings, except as set forth in the appended claims.

What is claimed is:

1. A cut potato product, comprising:

a three-sided longitudinally elongated and generally wedge-shaped potato piece having a profile defining a pair of cut surfaces oriented generally at an acute angle and each extending radially and angularly diverging from a common tip to a heel having a curved natural potato shape;

each of said cut surfaces defining a generally wave-shaped configuration with a wave pitch and a wave amplitude, and further wherein at least one of said wave pitch and said wave amplitude for each of said cut surfaces increases progressively from said tip to said heel.

2. The cut potato product of claim 1, wherein both of said wave pitch and said wave amplitude for each of said cut surfaces increases progressively from said tip to said heel.

3. The cut potato product of claim 1 wherein each of said cut surfaces further defines a relatively short straight segment at said tip.

4. The cut potato product of claim 1 wherein said wedge-shaped raw potato piece is fried.

5. The cut potato product of claim 1 wherein said longitudinally elongated and wedge-shaped potato piece is cut from a whole potato.

6. A cut and fried potato product formed by the process comprising the steps of:

cutting a three-sided longitudinally elongated and generally wedge-shaped potato piece in a raw state and having a profile defining a pair of cut surfaces oriented generally at an acute angle and each extending radially and angularly diverging from a common tip to a heel having a curved natural potato shape, each of said pair of cut surfaces defining a generally wave-shaped configuration with a wave pitch and a wave amplitude wherein at least one of said wave pitch and said wave amplitude for each of said cut surfaces increases progressively from said tip to said heel; and frying the cut generally wedge-shaped potato piece.

7. The product of claim 6 wherein said cutting step comprises forming both of said wave pitch and said wave amplitude for each of said cut surfaces to increase progressively from said tip to said heel.

8. The product of claim 6 wherein said cutting step comprises forming each of said cut surfaces to define a relatively short straight segment at said tip.

9. The product of claim 6 wherein cutting step comprises cutting said longitudinally elongated and wedge-shaped potato piece from a whole potato.

* * * * *